United States Patent [19]
Iwaki

[11] Patent Number: 5,883,613
[45] Date of Patent: Mar. 16, 1999

[54] MOVING PICTURES DISPLAY SYSTEM

[75] Inventor: Tsutomu Iwaki, Tokyo, Japan

[73] Assignee: Kabushiki Kaisha Toshiba, Kawasaki, Japan

[21] Appl. No.: 808,418

[22] Filed: Feb. 28, 1997

[30] Foreign Application Priority Data

Mar. 1, 1996 [JP] Japan .................................. 8-044806

[51] Int. Cl.⁶ .................................................. G09G 5/00
[52] U.S. Cl. ........................... 345/132; 345/115; 382/298
[58] Field of Search .................... 345/115, 116, 345/202, 520, 132, 131; 395/800.35, 308, 883, 677; 600/425; 382/298, 232, 235

[56] References Cited

U.S. PATENT DOCUMENTS

| | | | |
|---|---|---|---|
| 5,434,592 | 7/1995 | Dinwiddie, Jr. et al. | 345/133 |
| 5,530,858 | 6/1996 | Stanley et al. | 395/677 |
| 5,619,995 | 4/1997 | Lobodzinski | 600/425 |
| 5,630,174 | 5/1997 | Stone, III et al. | 345/520 |
| 5,682,484 | 10/1997 | Lambrecht | 395/308 |
| 5,692,211 | 11/1997 | Gulick et al. | 395/800.35 |
| 5,696,912 | 12/1997 | Bicevskis et al. | 395/308 |
| 5,710,572 | 1/1998 | Nihei | 345/115 |

*Primary Examiner*—Richard A. Hjerpe
*Assistant Examiner*—Francis Nguyen
*Attorney, Agent, or Firm*—Finnegan, Henderson, Farabow, Garrett & Dunner, L.L.P.

[57] ABSTRACT

A VPM (Video Port Manager) provider, which performs such control as to allow a VGA (Video Graphic Array) controller to effectively receive moving picture data from a ZV (Zoomed Video) port, acquires display environment information about the system display performance and the current display mode from a VGA BIOS (Video Graphic Array Basic Input Output System), and determines the maximum resolution of moving pictures displayable by the system based on that display environment information. When the resolution specified in the moving picture display request from a VPM client is greater than the displayable maximum resolution of moving pictures, the optimal data conversion processing needed to display moving picture data without causing a display disturbance and with a resolution closest to the specified resolution, such as data compression, frame thinning or line thinning, is performed on that moving picture data.

13 Claims, 7 Drawing Sheets

| PC CARD PIN NUMBER | PC CARD − 16 | ZV PORT MODE |
|---|---|---|
| 8 | A10 | HREF |
| 10 | A11 | VSYNC |
| 11 | A9 | Y0 |
| 12 | A8 | Y2 |
| 13 | A13 | Y4 |
| 14 | A14 | Y6 |
| 19 | A16 | UV2 |
| 20 | A15 | UV4 |
| 21 | A12 | UV6 |
| 22 | A7 | SCLK |
| 23 | A6 | MCLK |
| 24::25 | A[5::4] | RESERVED |
| 26::29 | A[3::0] | ADDRESS[3::0] |
| 33 | IOIS16# | PCLK |
| 46 | A17 | Y1 |
| 47 | A18 | Y3 |
| 48 | A19 | Y5 |
| 49 | A20 | Y7 |
| 50 | A21 | UV0 |
| 53 | A22 | UV1 |
| 54 | A23 | UV3 |
| 55 | A24 | UV5 |
| 56 | A25 | UV7 |
| 60 | INPACK# | LRCLK |
| 62 | BVD2/SPKR# | SDATA |

PATH 1: VIDEO OVERLAY
PATH 2: VRAM OFF-SCREEN WRITE
PATH 3: VRAM OFF-SCREEN READ

MOVING PICTURES DISPLAY SYSTEM

BACKGROUND OF THE INVENTION

The present invention relates to a moving pictures display apparatus system, and, more particularly, to a moving pictures display method and moving pictures display apparatus which are adapted to computer systems having an exclusive bus for moving pictures and a medium for storing codes for displaying moving pictures.

The entire contents of Japanese Patent Application No. 8-44806 filed on Mar. 1, 1996 are incorporated herein by reference.

Personal computers which can use PC cards that conform to the PCMCIA (Personal Computer Memory Card International Association) standards and JEIDA (Japanese Electronics Industry Development Association) standards are becoming popular these days. Recently, various developments have been made to use the PC cards as a video capture card for controlling the input and output of moving picture data, an MPEG (Moving Picture Coding Experts Group) decoder card and the like.

To efficiently process a vast amount of data like moving picture data, it becomes popular to design personal computers with system architectures which use the PCI local bus that can permit fast data transfer. Even the PCI local bus has a limit to the data transfer performance. When a PC card is used as a video capture card or an MPEG decoder card as mentioned above, therefore, the data transfer performance of the PCI local bus is insufficient.

In this respect, developments on techniques for using an exclusive bus for moving pictures, called "ZV (Zoomed Video) port," to directly connect a PC card to a display controller have recently started. The ZV port can permit a PC card to directly send video data and audio data to a display controller and an audio controller respectively without using the system bus. This overcomes the inconvenient long occupying of the system bus by the transfer of a vast amount of video data, and thus can allow moving pictures to be displayed without degrading the system performance. The ZV point is disclosed in a U.S. patent application Ser. No. 08/458,690 filed Jun. 2, 1995.

In conventional systems for transferring moving picture data to the display controller using such an exclusive moving picture bus, however, the displayable window size (the resolution of moving pictures) of moving picture data is determined specifically by software which controls the transfer of the moving picture data. The conventional systems cannot therefore display moving picture windows which are larger than the window size determined by the software.

There is another shortcoming originating from the system display performance such that when moving pictures whose resolution is greater than a certain level are displayed, the amount of transfer of moving pictures to a display monitor from a video memory per unit time becomes insufficient, thus causing a disturbance on the display screen.

BRIEF SUMMARY OF THE INVENTION

Accordingly, it is an object of the present invention to provide a moving pictures display method and moving pictures display apparatus which can display moving pictures on the screen with any requested resolution without causing a display disturbance or the like, and a medium having stored codes which permit such a display.

According to the first aspect of this invention, there is provided a method for displaying moving picture data with a resolution specified by a request from a program executing a computer system including a system bus, a moving picture bus, a display device and a display controller connected to the display device, the system bus and the moving picture bus, the display controller displaying moving picture data, transferred from a video device through the moving picture bus, with a resolution specified by a request from a program, comprising the steps of: determining a maximum display resolution of moving pictures based on information representing performance of the display device and a current display mode; reducing an amount of moving picture data when the resolution specified in the request is greater than the maximum display resolution; and displaying the moving picture data with the specified resolution or a resolution closest thereto.

According to the second aspect of this invention, there is provided a computer, comprising: a moving pictures bus for transferring moving picture data; a display device displaying the moving picture data; means for calculating a maximum display resolution of moving picture based on information representing display performance and a current display mode; means for determining whether or not a resolution specified by a request from a program executed by the computer is greater than the maximum display resolution; and display controller, connected to the display device and the moving picture bus, reducing an amount of the moving picture data transferred from a video device through the moving picture bus and displaying the moving picture data with the specified resolution or a resolution closest thereto when the resolution specified by the request greater than the maximum display resolution.

According to the third aspect of this invention, there is provided a computer program product for use in a computer system having a moving picture bus and display controller displaying moving picture transferred from a video device through the moving picture bus on a display, the computer program product comprising: a computer usable medium having computer readable program code means embodied in the medium for displaying moving picture data with a resolution specified by a request from a program; computer readable code means for determining a maximum display resolution of moving picture based on information indicating a display performance and a current display mode; and computer readable code means for reducing an amount of the moving picture data and displaying the reduced moving picture data with the specified resolution or a resolution closest thereto when the resolution specified by the request is greater than the maximum display resolution.

According to those moving pictures display method, moving pictures display apparatus and medium having stored a program for displaying moving pictures, software for controlling the transfer of moving pictures to a display controller via, for example, an exclusive moving picture bus acquires display environment information about the system display performance and the current display mode from a VGA BIOS (Video Graphic Array Basic Input Output System) or the like, and determines the maximum resolution of moving pictures displayable by the system based on the display environment information. When a request to display moving pictures is issued, the resolution of moving pictures which has been specified by the display request is compared with the maximum displayable resolution of moving pictures. When the specified resolution is greater than the maximum displayable resolution of moving pictures, data conversion processing, such as frame thinning or line thinning, to reduce the amount of display data is automatically performed on moving picture data. This scheme compensates for the insufficient amount of moving picture data to be transferred to the display monitor per unit time, so that moving pictures can be displayed with any requested resolution or a resolution close to the requested one without causing a display disturbance or the like.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serves to explain the principles of the invention.

DETAILED DESCRIPTION OF THE INVENTION

A preferred embodiment of the present invention will now be described with reference to the accompanying drawings.

Figure 1:
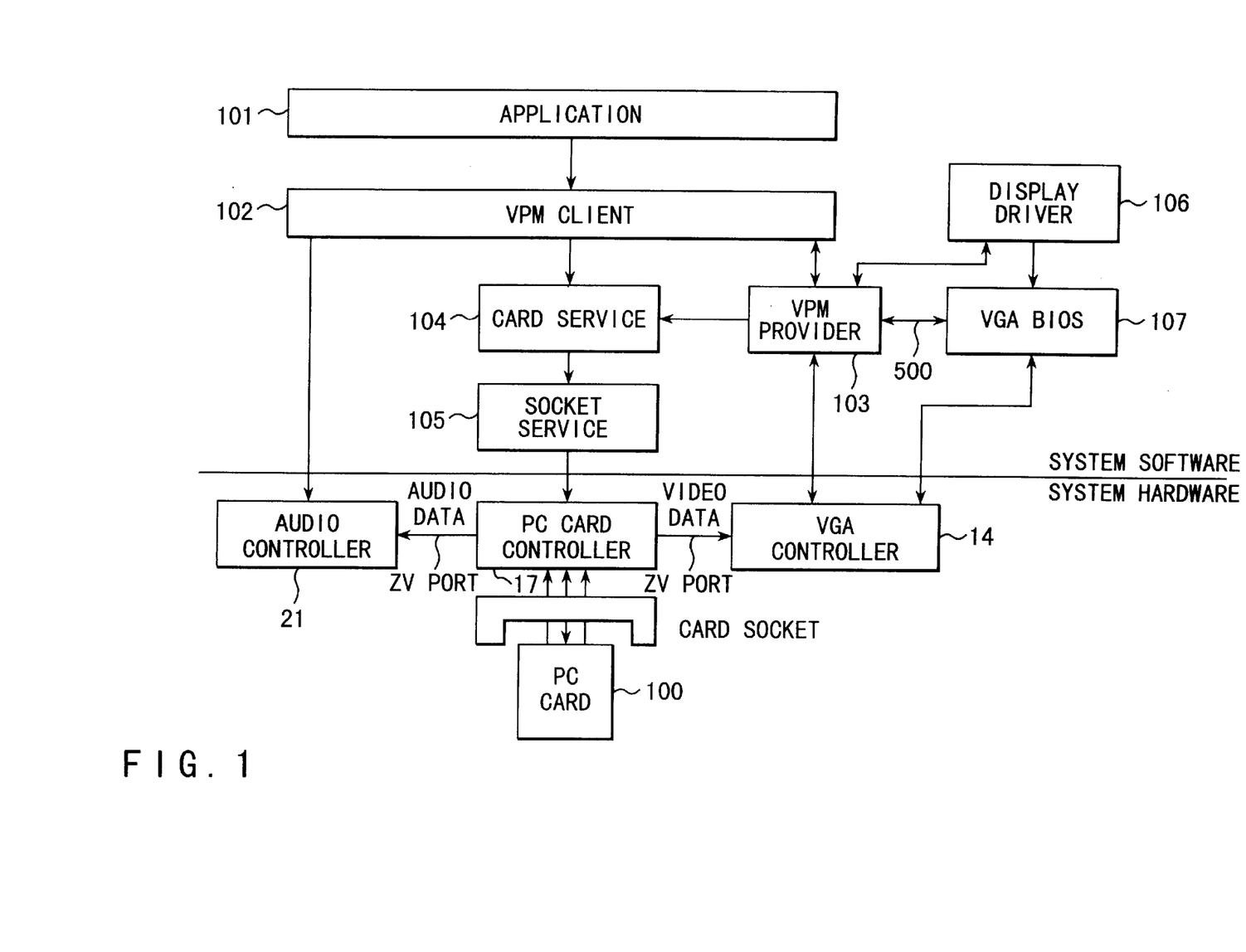
FIG. 1 is a block diagram illustrating the functional structures of software and hardware for accomplishing a moving pictures display method according to one embodiment of this invention.

FIG. 1 illustrates the functional structures of software and hardware for accomplishing a moving pictures display method according to one embodiment of this invention. In the illustrated case, a ZV port is provided as an exclusive moving picture bus in a notebook type personal computer.

A moving picture transfer system using a ZV port directly transfers video and audio data from a PC card 100 for the ZV port, which is realized as an MPEG decoder card or a video capture card, respectively to a VGA controller 14 and an audio controller 21 without using the system bus.

Besides a display driver 106 and a VGA BIOS 107 for controlling the graphics display of the VGA controller 14, a card service 104 and a socket service 105, which can identify the PC card 100 designed for the ZV port, a VPM (Video Port Manager) client 102 and a VPM provider 103 as drivers for controlling the transfer of video data and audio data to the associated VGA controller 14 and audio controller 21 using the ZV port are provided on the software side for the purpose of supporting the moving picture transfer system using the ZV port.

The VPM client 102 requests the VPM provider 103 to display moving pictures in response to a moving picture display request from an application program 101. When this request is permitted by the VPM provider 103, the VPM client 102 controls a PC card controller 17 and the PC card 100 using the card service 104, the socket service 105 and the like to initiate the transfer of video/audio data via the ZV port.

The VPM provider 103 has a moving picture display control function to allow the VGA controller 14 to display moving pictures with an arbitrary resolution specified by the moving picture display request from the VPM client 102.

More specifically, the VPM provider 103, which has an interface 500 for communication with the VGA BIOS 107, acquires display environment information about the system display performance and the current display mode from the VGA BIOS 107 via the interface 500 and from the display driver 106 via another interface, and determines the maximum resolution of moving pictures displayable by the system based on the display environment information.

The following information are stored as the display environment information in the VGA BIOS 107 and the display driver 106.

1) Memory type of VRAM (Video Random Access Memory)
2) Capacity of VRAM
3) Data bus width of memory
4) Device type of display unit (CRT, LCD, TV, etc.)
5) Type of LCD (TFT, DSTN, etc.)
6) Resolution (800×600, etc.)
7) The number of colors
8) Memory clock
9) Display frequency The VPM provider 103 obtains the effective memory bandwidth and the display mode (resolution and the number of colors) from those information.

When the resolution specified in the moving picture display request from the VPM client 102 is greater than the maximum resolution of moving pictures, the VPM provider 103 selects the optimal data conversion processing for the reduction of the display amount of moving picture data, such as frame thinning or line thinning, and executes the conversion processing itself or allows the VGA controller 14 or the display driver 106 or the like to execute it.

Accordingly, the insufficient amount of moving picture data to be transferred to the display monitor per unit time is compensated, so that moving pictures can be displayed with any requested resolution or a resolution close to the requested one without causing a display disturbance or the like.

This moving picture display control function of the VPM provider 103 is the feature of this invention, which will be discussed later with reference to FIGS. 6 to 9.

Figure 2:
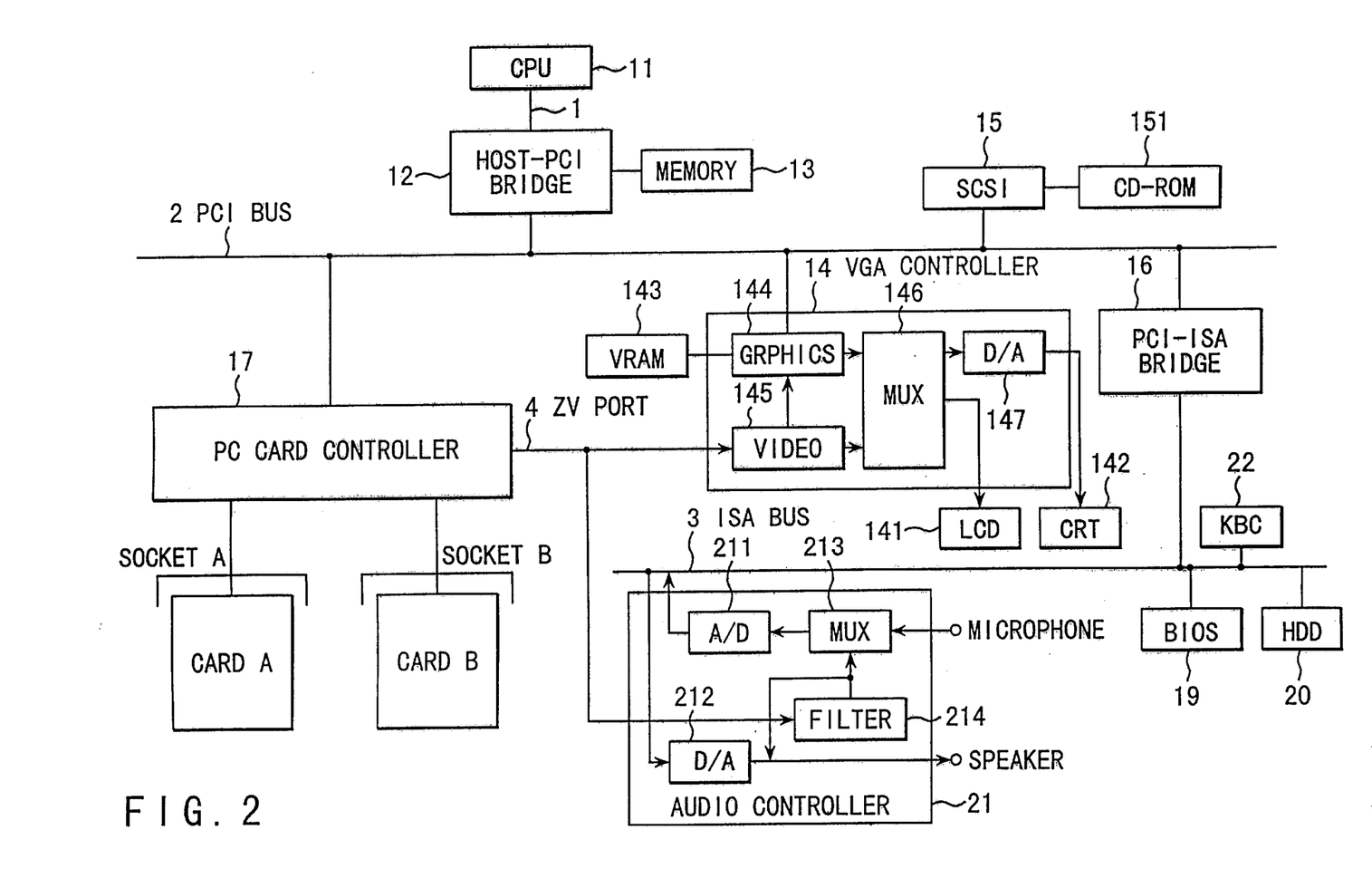
FIG. 2 is a block diagram showing the specific system structure of the computer system shown in FIG. 1.

FIG. 2 shows the specific system structure of the computer system which is used in this embodiment.

This system is a notebook type portable personal computer operable on the battery voltage and has a processor bus 1, an internal PCI bus 2, an internal ISA bus 3 and a ZV port 4 provided on its system board. The ZV port 4 is a video/ audio bus which directly connects the PC card socket to the VGA controller 14 and the audio controller 21 in a point-to-point fashion.

Further provided on the system board are a CPU 11, a host-PCI bridge unit 12, a memory 13, the VGA controller 14, an SCSI controller 15, an internal PCIISA bridge unit 16, the PC card controller 17, a BIOS ROM 19, an HDD 20, the audio controller 21 and a keyboard controller (KBC) 22.

The CPU 11 is realized by, for example, a microprocessor "Pentium" manufactured and sold by Intel Corporation. The processor bus 1, directly coupled to the input/output pins of this CPU 11, has a 64-bit data bus.

The memory 13 is a memory device for storing an operating system, various kinds of device drivers, an application program to be run, data to be processed or the like, and is comprised of a plurality of DRAM modules. This memory 13 consists of a system memory previously installed on the system board and an extended memory which is to be installed as needed by a user. A synchronous DRAM, Rambus or the like is used as each DRAM module constituting those system memory and extended memory.

The host-PCI bridge unit 12 is a bridge LSI (large scale integrated circuit) which connects the processor bus 1 to the internal PCI bus 2, and serves as one of bus masters for the PCI bus 2. This host-PCI bridge unit 12 has a function for bidirectionally converting the bus cycle including data and addresses between the processor bus 1 and the internal PCI bus 2 and a function for controlling access to the memory 13 via the memory bus.

The internal PCI bus 2 is a clock synchronous input/output bus, which allows all the cycles on the internal PCI bus 2 to be executed synchronously. The maximum frequency of the PCI bus clock is 33 MHz. The PCI bus 2 has an address/data bus which is used in a time-divisional fashion. This address/data bus has a width of 32 bits.

The data transfer cycle on the PCI bus 2 consists of an address phase and one or more data phases following the address phase. The address and the transfer type are output in the address phase, while 8-bit, 16-bit, 24-bit or 32-bit data is output in the data phase.

Like the host-PCI bridge unit 12, the VGA controller 14 is one of the bus masters for the PCI bus 2. This VGA controller 14 displays image data in a video memory (VRAM) 143 on an LCD 141 or an external CRT display 142, and supports the display of moving pictures using the ZV port 4 in addition to the VGA display of texts and graphics data.

This VGA controller 14 is provided with a graphics display controller (GRAPHICS) 144, a video display controller (VIDEO) 145, a multiplexer 146, a D/A converter 147, etc.

The graphics display controller 144, which is a VGA compatible graphics controller, converts VGA graphics data drawn in the VRAM 143 into RGB video data and outputs the converted video data. The graphics display controller 144 includes a hardware logic for performing various kinds of graphics operations and an accelerator for drawing graphics data.

The video display controller 145 has a video buffer for storing digital YUV data which is transferred via the ZV port 4, a circuit for sending the YUV data stored in the video buffer to the graphics display controller 144 to be written in the VRAM 143, and a YUV-RGB converter for converting the YUV data into RGB video data. The video buffer includes two buffers which are alternately switched for the input of moving picture data and the display of moving picture data to thereby accomplish a double buffering structure.

The multiplexer 146 selects either the output data of the graphics display controller 144 or the output data of the video display controller 145, or combines the video output of the video display controller 145 on the VGA graphics data from the graphics display controller 144 and sends the synthesized data to the color LCD 141 and the D/A converter 147. The D/A converter 147 converts the video data from the multiplexer 146 to analog RGB signals and outputs the RGB signals to the CRT display 142.

The internal PCI-ISA bridge unit 16 is a bridge LSI for connecting the internal PCI bus 2 to the internal ISA bus 3 and serves as one of PCI devices. This internal PCI-ISA bridge unit 16 incorporates a PCI bus arbiter and a DMA controller. Connected to the internal ISA bus 3 are the BIOS ROM 19, the HDD 20, the audio controller 21 and the keyboard controller 22.

The audio controller 21 controls the input/output of audio data under the control of the CPU 11. This audio controller 21 comprises an A/D converter 211 for performing the A/D conversion of an audio signal from a microphone terminal, a D/A converter 212 which sends digital audio data from the CPU 11 as an analog signal to a speaker terminal, a filter circuit 214 which converts digital audio data, supplied from a PC card via the ZV port 4, to an analog signal and sending it to the speaker terminal, and a multiplexer 213 which selects either the output of the filter circuit 214 and the audio signal from the microphone terminal or synthesizes both outputs, and sends out the output signal.

The PC card controller 17, one of PCI devices, controls a 16-bit PC card designed to conform to the PCMCIA specifications and 32-bit PC card designed to conform to the card bus specifications, under the control of the CPU 11. This PC card controller 17 supports the ZV port.

The PC card controller 17 has two operation modes: the normal mode and multimedia mode (ZV port mode). In the normal mode which is for controlling an ordinary PC card like a modem card, the PC card controller 17 performs data transfer between the PCI bus 2 and the PC card and does not use the ZV port 4.

The multimedia mode (ZV port mode) is used when a PC card, designed to handle moving pictures and the ZV port, like a video capture card, an MPEG encoder card or an MPEG decoder card, is installed in the PC card socket. In this mode, the aforementioned ZV port 4 is used.

That is, the PC card controller 17 directly transfers digital video data (digital YUV) and digital audio data, output from a PC card designed to cope with the ZV port, to the VGA controller 14 and the audio controller 21 via the ZV port 4.

The switching of the operation modes between the normal mode and the multimedia mode is accomplished by using the system software illustrated in FIG. 1 which is executed by the CPU 11. The card service 104 and the socket service 105 read attribute information from the PC card installed in the PC card socket and detect the type of the installed PC card based on the attribute information. When the installed PC card is designed for the multimedia mode (ZV port), the VPM client 102 switches the PC card controller 17 to the multimedia mode via the card service 104 and the socket service 105.

The PC card interfaces in those normal mode and multimedia mode will now be discussed with reference to FIG. 3.

Figure 3:
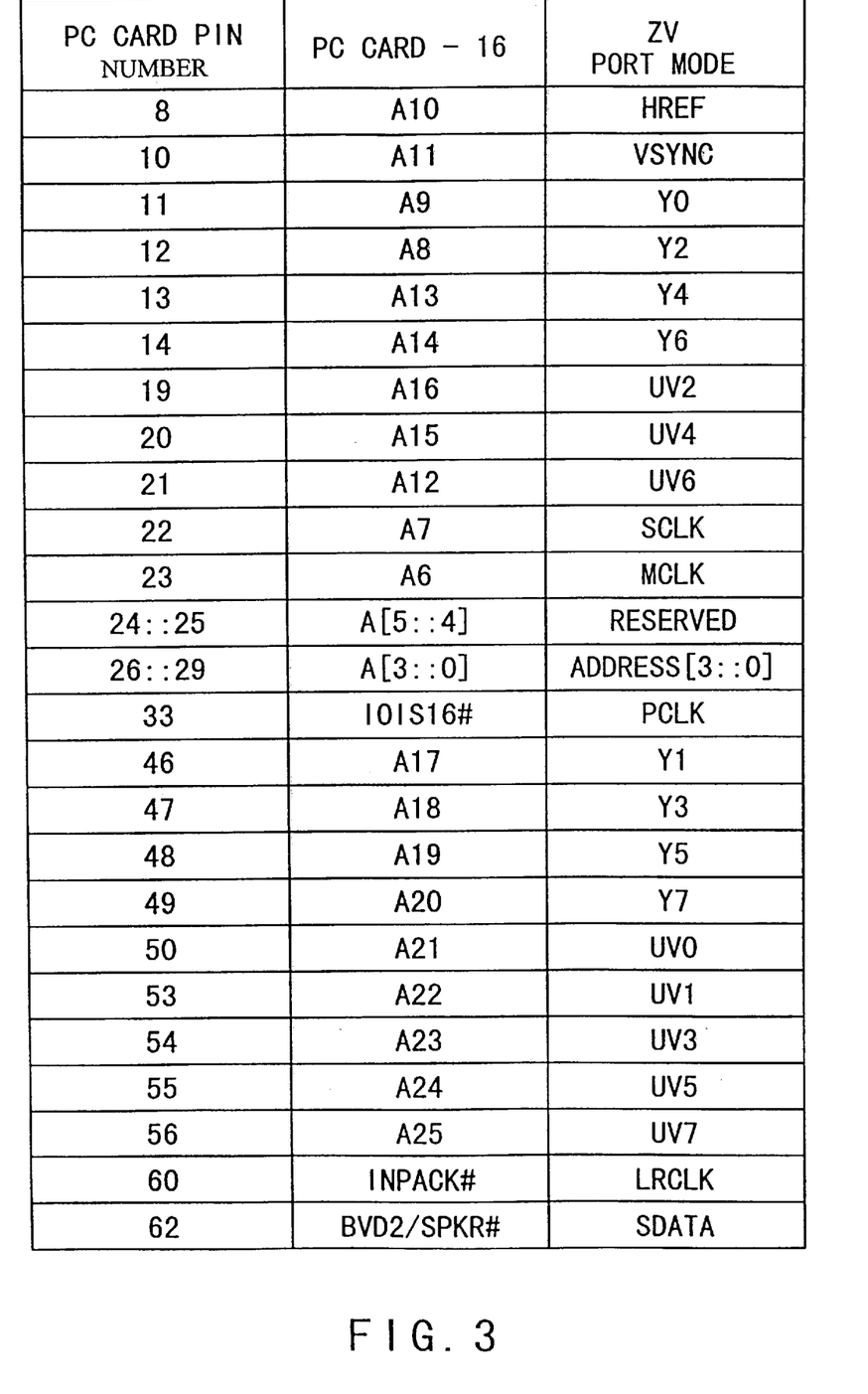
FIG. 3 is a diagram depicting a PC card interface in the normal mode and multimedia mode of a PC card to be used in the system shown in FIG. 1.

FIG. 3 shows the interface for a 16-bit PC card. As illustrated, in the normal mode, the PC card interface consisting of 68 pins is used in accordance with the standard pin assign rules that are specified in the PCMCIA specifications.

In the multimedia mode, on the other hand, address pins (A25–A7) or the like are used to output moving picture data (digital YUV data: 8-bit luminance data Y and 8-bit color difference data UV) from the PC card, horizontal and vertical sync signals (HREF and VSYNC) and a pixel clock (PCLK), while the I/O port acknowledge pin (INPACK) and audio output line (SPKR) are used to output audio data (SDATA) from the PC card and a signal (LRCK) indicating whether the current audio data is output from the left channel or the right channel.

Figure 4:
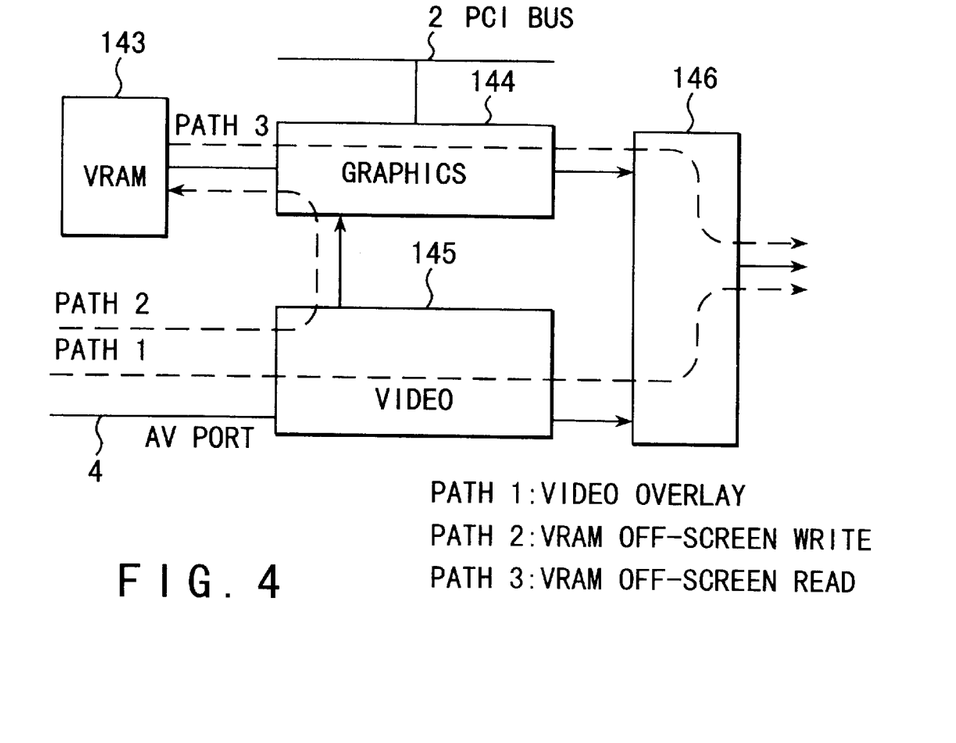
FIG. 4 is a diagram showing the flow of moving picture data in a VGA controller used in the system shown in FIG. 1.

FIG. 4 shows the flow of moving picture data in the VGA controller 14.

There are two display modes for moving picture data: a video overlay mode for overlaying moving picture data, input via the ZV port 4, on graphics data without being written in the VRAM 143, and a mode for writing moving picture data into the VRAM 143 and selectively reading graphics data and moving picture data from the VRAM 143 for the display purpose. The flow of moving picture data in the video overlay mode is a path P1, and no moving picture data conversion processing like the aforementioned thinning is basically performed in this mode.

In the VRAM writing mode, moving picture data flows through a path P2 and a path P3. Moving picture data conversion processing can be performed in either the path P2 or the path P3 or in both paths P2 and P3.

Figure 5:
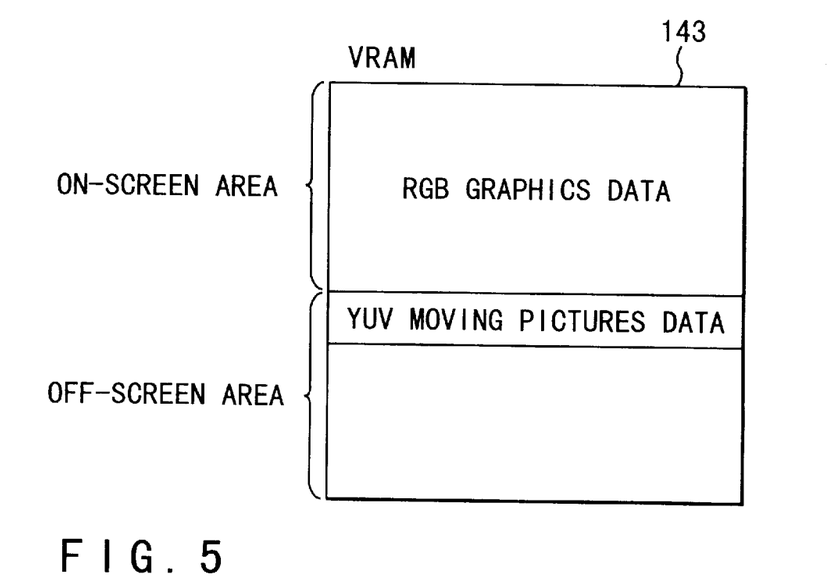
FIG. 5 is a diagram for explaining the format of storing moving picture data into a video memory in the system shown in FIG. 1.

In writing moving picture data into the VRAM 143, this moving picture data is written in the off-screen area in the VRAM 143 in the format of digital YUV data, as shown in FIG. 5. This is because digital YUV data has such a characteristic as to be able to express the same number of colors with a smaller data size than the graphics data like packed pixels.

Figure 6:
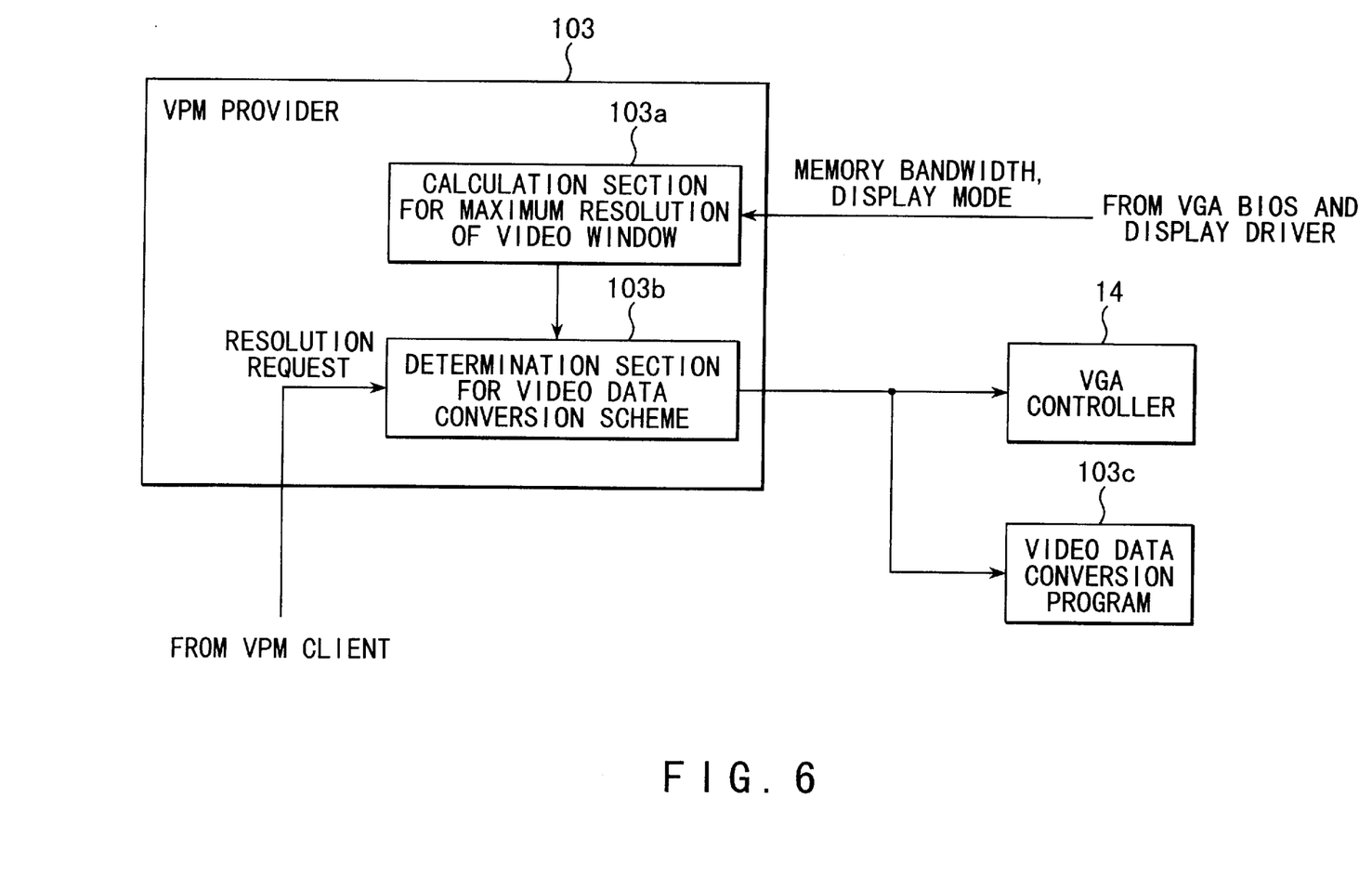
FIG. 6 is a diagram for explaining the functional structure of a VPM provider used in the system shown in FIG. 1.

Referring now to FIG. 6, the moving picture display control function of the VPM provider 103 will be discussed.

As mentioned earlier, the moving picture display control function of the VPM provider 103 is used to permit the VGA controller 14 to display moving pictures with an arbitrary resolution specified by the moving picture display request. This control function is accomplished by a calculation section 103a for the maximum resolution of a video window and a determination section 103b for a video data conversion scheme.

The calculation section 103a acquires information about the display performance of the computer system provided with the VPM provider 103, information about the current display mode (display resolution, the number of display colors, etc.), and the like via the VGA BIOS 107 and the display driver 106, and calculates the maximum window size of moving pictures displayable by this system based on the acquired information. The information about the display performance includes information about the memory bandwidth of the VRAM 143 and information indicating the type of a flat panel display which is used as the display monitor.

The information about the memory bandwidth includes the storage capacity of the VRAM 143 (e.g., 2 Mbytes, 4 Mbytes or the like), the frequency of the memory clock which defines the speed of reading data from the VRAM 143, and the memory data bus width (e.g., 32 bits, 64 bits or the like). The information indicating the type of the flat panel display indicates whether the LCD 141 in use is a TFT type or a DSTN type, for example.

The calculation section 103a first calculates the maximum data transfer rate for reading moving picture data from the VRAM 143 per unit time, from the information about the memory bandwidth. Based on the computed maximum data transfer rate and the current display mode (display resolution and the number of display colors), the calculation section 103a determines the maximum window size (resolution for moving pictures) which is currently displayable by this system.

The determination section 103b compares the resolution for moving pictures, specified by the moving picture display request from the VPM client 102, with the currently displayable maximum resolution for moving pictures to check if there is any need for video data conversion processing on moving picture data. When the specified resolution is greater than the currently displayable maximum resolution, it is determined that video data conversion processing is needed. Then, the optimal moving picture data conversion processing for displaying moving pictures with a resolution as close as to the specified resolution without causing a display disturbance is determined from the difference the specified resolution and the currently displayable maximum resolution and the type of the LCD 141.

It is preferable that frame thinning of moving picture data, line thinning of moving picture data or the like be used as the moving picture data conversion processing. When the LCD 141 is a DSTN type, particularly, the display response speed is slow so that it is desirable to substantially slow the display refresh speed by frame thinning. For example, 30 frames per second may be reduced to 25 frames per second. This processing eliminates display noise or the like and can thus display smoother moving pictures than the case where no thinning is performed. As line thinning, a scheme for thinning every predetermined number of lines or a scheme for performing filtering to produce a single line from a plurality of consecutive lines (two or 3 lines). Also available is compression/decompression for writing moving picture data into the VRAM 143 after compression, reading compressed moving picture data from the VRAM 143 and decompressing the read data. This processing can substantially increase the speed of reading data from the VRAM 143. MPEG 1, YUV compression or the like may be used for the compression of moving picture data. It is also possible to use a method of reducing the amount of information indicating colors, for example, reducing 6-bit information indicating colors to five bits to thereby decrease the number of colors.

Such moving picture data conversion processing like frame thinning, line thinning or compression/decompression is executed on the hardware base by the VGA controller 14 under the control of the determination section 103b. This conversion processing may be executed by an exclusive video data conversion program 103c prepared in the display driver 106 or the VPM provider 103.

The flow of moving picture data and a sequence of procedures of the display control for the moving picture data will now be described referring to FIG. 7.

When the application program 101 issues a request for displaying moving picture data, the VPM client 102 informs the VPM provider 103 of the event and request the VPM provider 103 to initiate the display of moving pictures with a certain resolution. The VPM provider 103 determines the optimal moving picture data conversion processing from the resolution specified by the VPM client 102 and the aforementioned memory band information, display mode information and display type information, and then sends a permission acknowledgment to the VPM client 102.

When the display of moving pictures is permitted by the VPM provider 103, the VPM client 102 controls the PC card controller 17 and the PC card 100 using the card service 104, the socket service 105 and the like to initiate the transfer of moving picture data via the ZV port 4. Consequently, the moving picture data is input to the VGA controller 14 via the ZV port 4 as shown in FIG. 7. With regard to the moving picture data input to the VGA controller 14, it is determined if there is a need for data conversion processing (step S10). When no data conversion processing is required, i.e., when the resolution specified by the display request is equal to or smaller than the maximum resolution for moving pictures, the moving picture data is directly written in the off-sacred area in the VRAM 143.

When it is determined that data conversion processing is needed (YES in step S10), i.e., when the resolution specified by the display request is greater than the maximum resolution for moving pictures, conversion processing for reducing the amount of data by the moving picture data conversion scheme (compression or frame or line thinning) which has been determined by the VPM provider 103 is executed after which the resultant moving picture data is written in the off-screen area in the VRAM 143.

Thereafter, the moving picture data written in the off-screen area in the VRAM 143 is converted to RGB data which is in turn output to the display.

Figure 7:
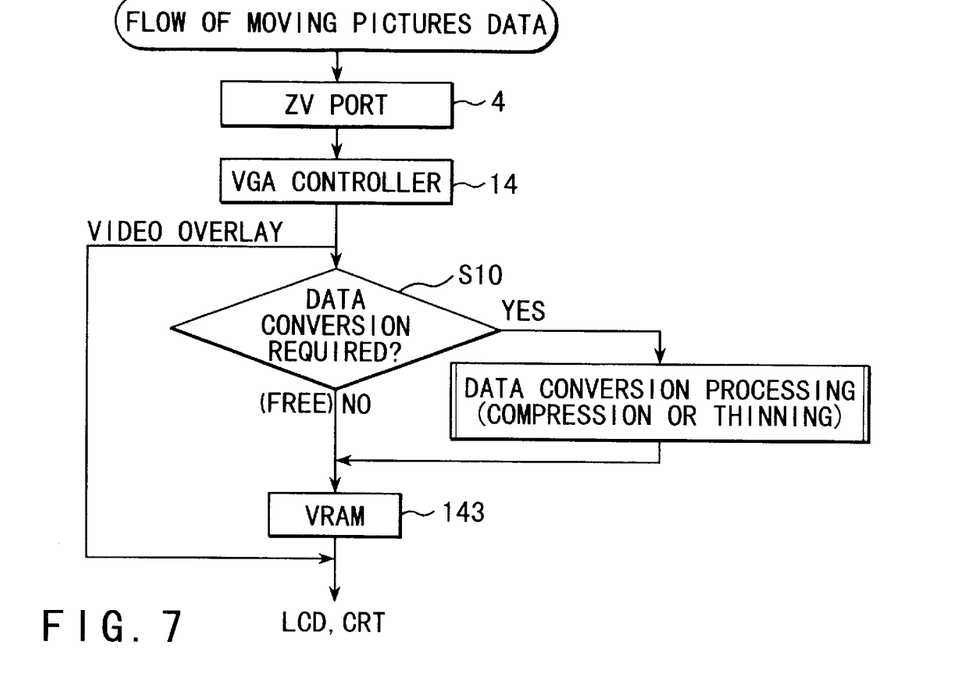
FIG. 7 is a flowchart for explaining the flow of moving picture data in the system shown in FIG. 1 and the procedures of controlling the display of moving picture data.
Figure 8:
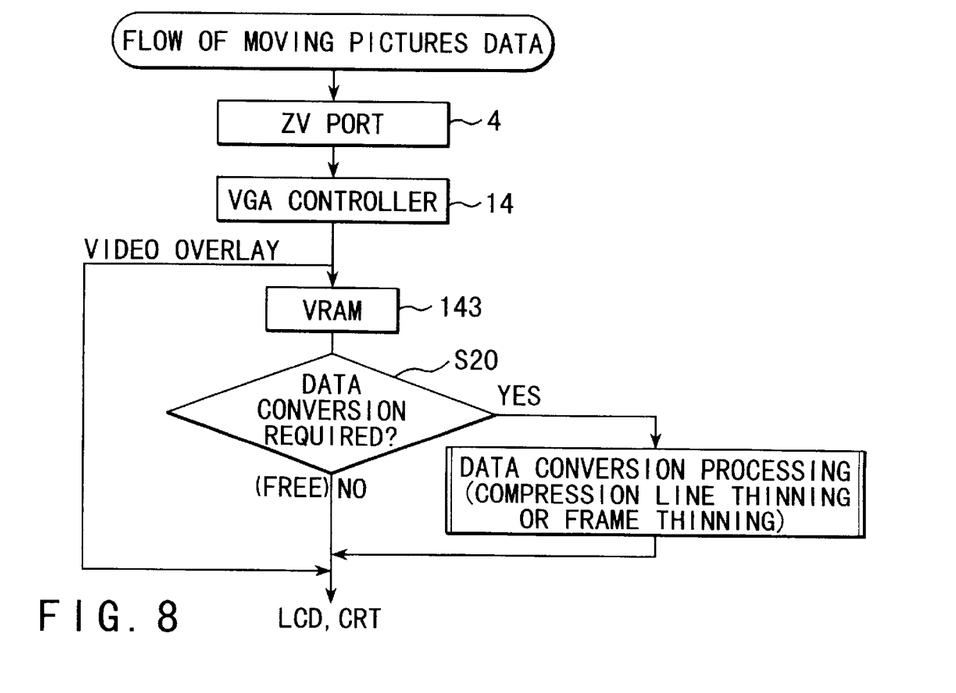
FIG. 8 shows a first modification of the flowchart illustrated in FIG. 7.

In the above-described procedures illustrated in FIG. 7, the moving picture data conversion processing is carried out before data storage into the VRAM 143. But, the moving picture data conversion processing should not necessarily be performed before data storage into the VRAM 143. As shown in FIG. 8, for example, conversion processing for reducing the amount of data by the moving picture data conversion scheme (compression or frame or line thinning) which has been determined by the VPM provider 103 may be performed at the time of acquiring moving picture data written in the off-screen area in the VRAM 143, after which the resultant data is converted to RGB data which is in turn output to the display.

Figure 9:
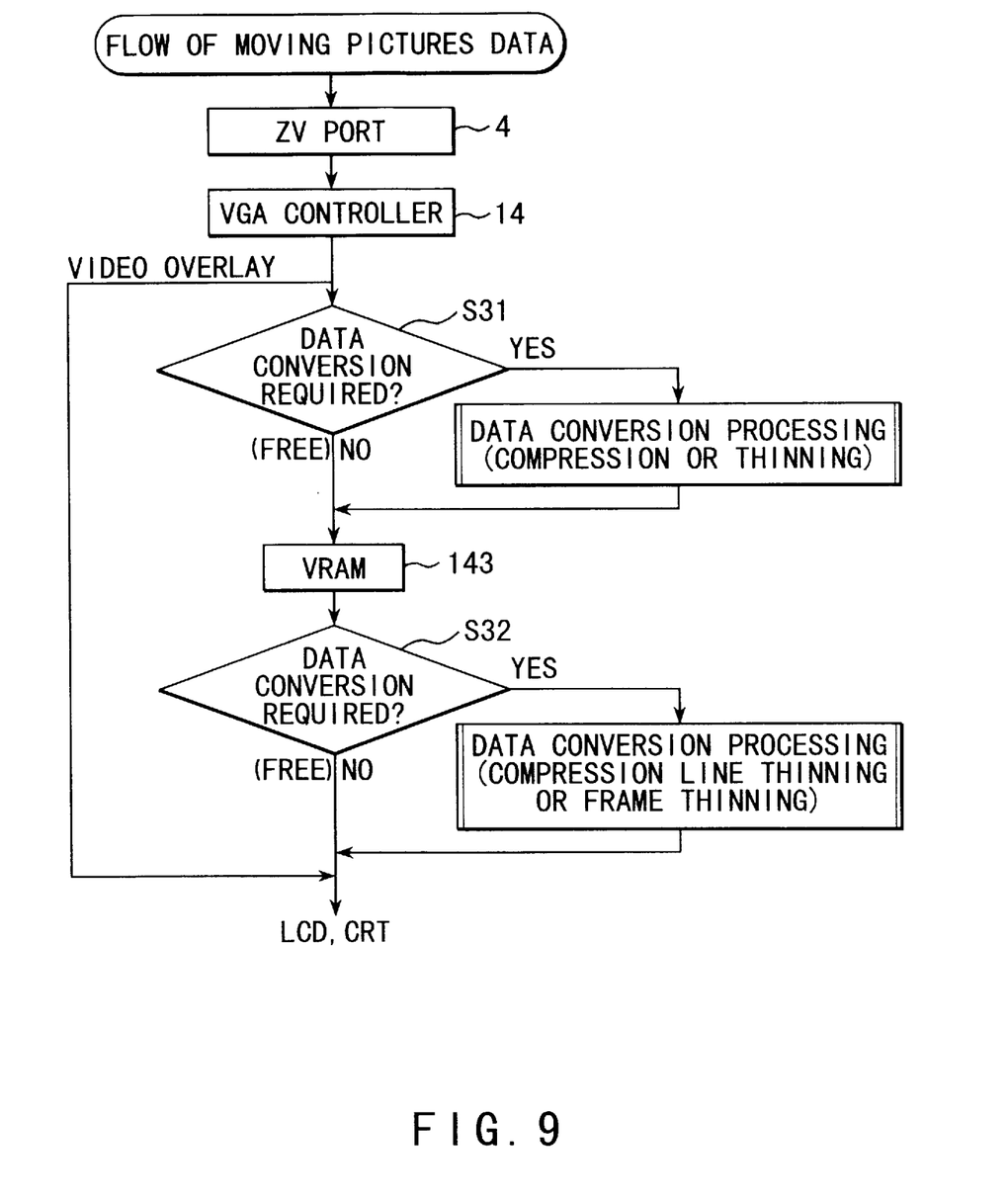
FIG. 9 shows a second modification of the flowchart illustrated in FIG. 7.

Further, data conversion processing may be executed before data storage into the VRAM 143 and also at the time of acquiring moving picture data from the VRAM 143, as shown in FIG. 9.

Note that decision steps S20, S31 and S32 in FIGS. 8 and 9 are the same as the decision step S10 in FIG. 7 which determines the need for data conversion processing.

According to this embodiment, as described above, the VPM provider 103, which performs such control as to allow the VGA controller 14 to effectively receive moving picture data from the ZV port 4, acquires display environment information about the system display performance and the current display mode from the VGA BIOS 107, and determines the maximum resolution of moving pictures displayable by the system based on that display environment information. When the resolution specified in the moving picture display request from the VPM client 102 is greater than the displayable maximum resolution of moving pictures, the optimal data conversion processing needed to display moving picture data without causing a display disturbance and with a resolution closest to the specified resolution, such as frame thinning or line thinning, is automatically performed on that moving picture data. This compensates for the insufficient amount of moving picture data to be transferred to the display monitor per unit time, so that moving pictures can be displayed with any requested resolution or a resolution close to the requested one without causing a display disturbance or the like.

Although the foregoing description of this embodiment has illustrated the ZV port as an exclusive moving picture bus, a VAFC (VESA Advanced Future Connector), LPB or the like may also be used as an exclusive moving picture bus.

Although the VPM provider 103 automatically determines and executes the optimal moving picture data conversion processing in this embodiment, a list of available data conversion schemes may be shown to a user so that moving picture data conversion processing is executed with the scheme designated by the user. Furthermore, the optimal moving picture data conversion processing may previously be designated by a manufacture of products embodying this invention.

Moreover, a program which accomplishes the above-described display method may be stored in a storage medium like a CD-ROM 151 shown in FIG. 2 and may be run as needed by various kinds of computer systems.

According to this invention, as apparent from the above, moving pictures can be displayed with the requested arbitrary resolution or a resolution close thereto without causing a display disturbance and even when the system display performance is low.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

I claim:

1. A method for displaying moving picture data with a resolution specified by a request from a program executed by a computer system including a system bus, a moving picture bus, a display device and a display controller connected to the display device, the system bus and the moving picture bus, the display controller displaying moving picture data, transferred from a video device through the moving picture bus, with the resolution specified by a request from a program, comprising the steps of:

determining a maximum displayable resolution of moving pictures based on information representing performance for a display function and a current display mode, wherein the maximum displayable resolution indicates a maximum displayable size of the moving pictures;

reducing an amount of moving picture data when the resolution specified in displaying the moving picture data with the specified resolution or a resolution closest thereto.

2. The method according to claim 1, wherein the display device has a flat panel display and the information has a type data of the flat panel display.

3. The method according to claim 1, wherein the information has at least one of memory size data of a video memory storing the moving picture data, memory clock data and bus width data of the video memory.

4. The method according to claim 1, wherein the reducing step has a step of thinning moving picture data in units of frames or in units of lines.

5. The method according to claim 1, wherein the reducing step has a step of compressing the moving picture data at a time of writing the moving picture data in the video memory.

6. The method according to claim 1, wherein the reducing step is executed by a graphics calculation function of the display controller.

7. A computer, comprising:

a moving pictures bus for transferring moving picture data;

a display device displaying the moving picture data;

means for computing a maximum displayable resolution of a moving picture based on information representing performance for a display function and a current display mode, wherein the maximum display resolution indicates a maximum displayable size of the moving picture;

means for determining whether or not a resolution specified by a request from a program executed by the computer is greater than the maximum displayable resolution; and a display controller, connected to the display device and the moving picture bus, reducing an amount of the moving picture data transferred from a video device through the moving picture bus and displaying the moving data with the specified resolution or a resolution closest thereto when the resolution specified by the request is greater than the maximum displayable resolution.

8. The apparatus according to claim 7, wherein the display device has a flat panel display and the information has a type data of the flat panel display.

9. The apparatus according to claim 7, wherein the information has at least one of memory size data of a video memory storing the moving picture data, memory clock data and bus width data of the video memory.

10. The apparatus according to claim 7, wherein the display controller thins the moving picture data in units of frames or in units of lines.

11. The apparatus according to claim 7, wherein the display controller compresses the moving picture data at a time of writing the moving picture data in the video memory.

12. The apparatus according to claim 7, wherein the display controller has a graphics calculation function executing the reducing function.

13. A computer program product for use in a computer system having a moving picture bus and display controller displaying moving picture data transferred from a video device through the moving picture bus onto a display, the computer program product comprising:

a computer usable medium having computer readable program code means embodied in the medium for displaying the moving picture data with a resolution specified by a request from a program;

computer readable code means for determining a maximum displayable resolution of moving picture data based on information indicating performance for a display function and a current display mode, wherein the maximum displayable resolution indicates a maximum displayable size of the moving picture data; and computer readable code means for reducing an amount of the moving picture data and displaying the reduced moving picture data with the specified resolution or a resolution closest thereto when the resolution specified by the request is greater than the maximum displayable resolution.

* * * * *

UNITED STATES PATENT AND TRADEMARK OFFICE
CERTIFICATE OF CORRECTION

PATENT NO. : 5,883,613
DATED : March 16, 1999
INVENTOR(S) : Iwaki

It is certified that error appears in the above-identified patent and that said Letters Patent is hereby corrected as shown below:

Claim 1, column 10, line 38, after "specified in", insert --the request is greater than the maximum displayable resolution; and--.

Signed and Sealed this

Seventh Day of December, 1999

*Attest:*

Q. TODD DICKINSON

*Attesting Officer*      *Acting Commissioner of Patents and Trademarks*